(12) United States Patent
Mercuri et al.

(10) Patent No.: US 6,521,369 B1
(45) Date of Patent: Feb. 18, 2003

(54) FLOODING-REDUCING FUEL CELL ELECTRODE

(75) Inventors: Robert Angelo Mercuri, Seven Hills; Daniel Witold Krassowski, Columbia Station, both of OH (US)

(73) Assignee: Graftech Inc., Lakewood, OH (US)

( * ) Notice: Subject to any disclaimer, the term of this patent is extended or adjusted under 35 U.S.C. 154(b) by 0 days.

(21) Appl. No.: 09/714,094

(22) Filed: Nov. 16, 2000

(51) Int. Cl.$^7$ ................................. H01M 4/86
(52) U.S. Cl. ........................ 429/40; 429/38; 429/39; 429/30
(58) Field of Search ..................... 429/40, 38, 39, 429/30

(56) References Cited

U.S. PATENT DOCUMENTS

| | | | |
|---|---|---|---|
| 3,404,061 A | 10/1968 | Shane et al. ............... | 161/125 |
| 4,895,713 A | 1/1990 | Greinke et al. ............. | 423/448 |
| 5,773,480 A | 6/1998 | Stone et al. ................ | 521/27 |
| 5,834,523 A | 11/1998 | Steck et al. ................ | 521/27 |
| 5,902,762 A | 5/1999 | Mercuri et al. ............. | 501/99 |
| 6,037,074 A | * 3/2000 | Mercuri et al. ............. | 429/34 |

* cited by examiner

*Primary Examiner*—Laura Weiner
(74) *Attorney, Agent, or Firm*—James R. Cartiglia

(57) ABSTRACT

An electrode for an electrochemical fuel cell is provided. More particularly, an electrode formed of a sheet of a compressed mass of expanded graphite particles having a plurality of transverse fluid channels passing through the sheet between first and second opposed surfaces of the sheet, is provided. The size, shape and/or placement of the channels, and/or the density of the sheet, is engineered so as to reduce or minimize flooding in the fuel cell.

23 Claims, 10 Drawing Sheets

FLOODING-REDUCING FUEL CELL ELECTRODE

TECHNICAL FIELD

The invention relates to an engineered electrode for an electrochemical fuel cell, comprising an article formed of a flexible graphite sheet that is fluid permeable and has enhanced isotropy with respect to thermal and electrical conductivity, and which is formed so as to minimize or reduce the flooding which can at times be observed with prior flexible graphite sheets when used as an electrochemical fuel cell electrode.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. The air stream on the cathode side removes the water formed by combination of the hydrogen and oxygen. Combinations of such fuel cells are used in a fuel cell stack to provide the desired voltage.

One limiting factor to the use of flexible graphite sheets as the cathode for PEM fuel cells is the accumulation of water at or in the electrodes, which can interfere with operation of the fuel cell. Indeed, since the cathodic side of the fuel cell is the site of water formation during fuel cell operation, "flooding" of the cathode can occur, which physically blocks the oxygen atoms from joining with the protons, with resulting inoperability of the fuel cell.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.08 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

This considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and substantially less in the direction parallel to the major faces of the flexible graphite sheet ("a" direction). In applications such as electrodes for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the major surfaces of the flexible graphite sheet is relatively high, while it is relatively low in the "c" direction transverse to the major surfaces.

Flexible graphite sheet can be provided with channels, which are preferably smooth-sided, and which pass between the parallel, opposed surfaces of the flexible graphite sheet and are separated by walls of compressed expanded graphite. When the flexible graphite sheet functions as an electrode in an electrochemical fuel cell, and is placed so as to abut the ion exchange membrane, so that the "tops" of the walls of the flexible graphite sheet abut the ion exchange membrane.

The potential of a flexible graphite sheet to flood when utilized as the cathode in a PEM fuel cell is addressed by the present invention.

SUMMARY OF THE INVENTION

The present invention provides an electrode for a PEM fuel cell. The electrode is formed of a sheet of a compressed mass of expanded graphite particles having a plurality of transverse fluid channels passing through the sheet between first and second opposed surfaces of the sheet. The transverse fluid channels are advantageously formed by mechanically impacting an opposed surface of the graphite sheet to displace graphite within the sheet at predetermined locations to provide a channel pattern. The transverse fluid channels are separated by walls of compressed expanded graphite.

By engineering the geometry and/or location of the channels in the sheet or the characteristics of the sheet itself, water outflow from and through the sheet can be modified, and flooding, especially at the cathodic side of the fuel cell, can be reduced or even eliminated. For example, if it is determined that flooding is more likely near the outlet of the fuel cell, the channels can be designed so as to have a larger diameter than at the inlet, where gas flow to the membrane and catalyst are the primary concern. Moreover near the outlet, the shape and/or arrangement of the channels can be engineered, such that water outflow through the electrode and gas inflow at the inlet side are each encouraged. Channel pattern density (i.e., the number of channels per square centimeter of sheet) and density of the flexible graphite sheet itself can also be advantageously employed in this regard. Likewise, combinations of the foregoing can be utilized to optimize gas inflow and water outflow.

DETAILED DESCRIPTION OF THE INVENTION

Figure 1:
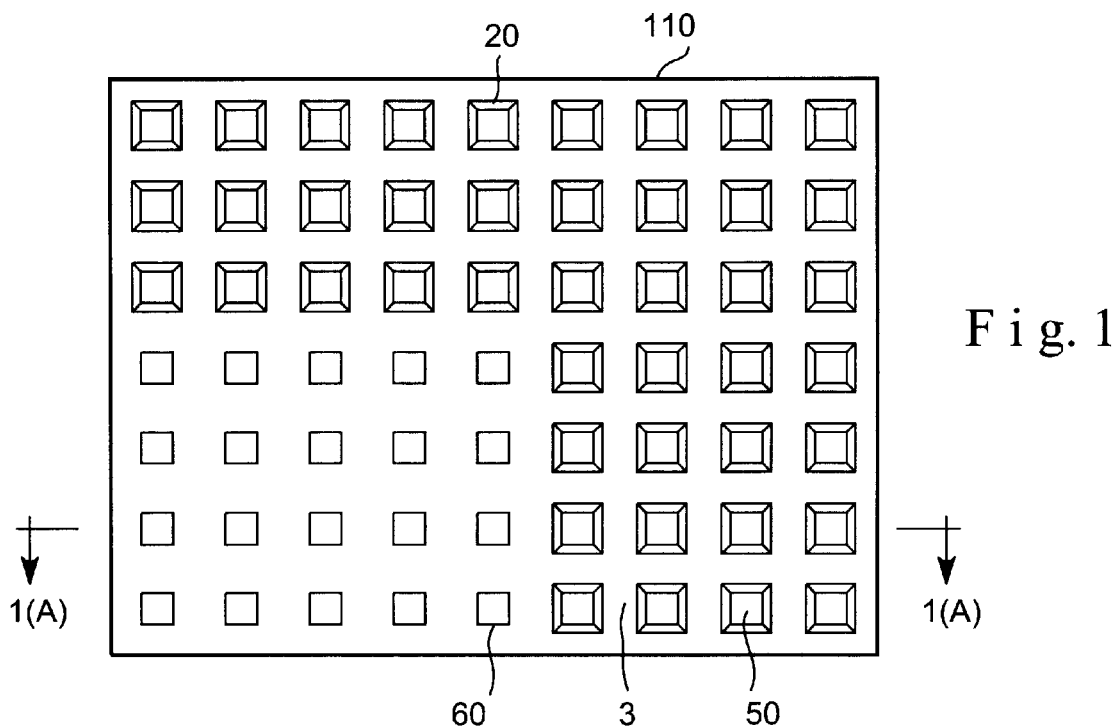
FIG. 1 is a plan view of a transversely permeable sheet of flexible graphite having transverse channels engineered in accordance with the present invention.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than six weight percent. More preferably, the graphite employed for the present invention will have a purity of at least about 99%. In the most preferred embodiment, the graphite employed will have a purity of at least about 99.9%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl fonnate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5-30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet. Suitable resin content is preferably about 20 to 30% by weight, suitably up to about 60% by weight.

In the practice of this invention, the flexible graphite sheet is provided with channels, which are preferably smooth-sided, and which pass between the parallel, opposed surfaces of the flexible graphite sheet and are separated by walls of compressed expanded graphite. It is the "tops" of the walls of the flexible graphite sheet that actually abut the ion exchange membrane, when the inventive flexible graphite sheet functions as an electrode in an electrochemical fuel cell.

The channels preferably have openings on one of the opposed surfaces that are larger than the openings in the other opposed surface. The channels can have different configurations, which can be formed, for instance, using flat-ended protrusion elements of different shapes. The smooth flat-ends of the protrusion elements preferably ensure deformation and complete displacement of graphite within the flexible graphite sheet, i.e. there are no rough or ragged edges or debris resulting from the channel-forming impact. Preferred protrusion elements have decreasing cross-section in the direction away from the pressing force, such as a roller, to provide larger channel openings on the side of the sheet that is initially impacted. The development of smooth, unobstructed surfaces surrounding channel openings enables the free flow of fluid into and through smooth-sided channels. In a preferred embodiment, openings on one of the opposed surfaces are larger than the channel openings in the other opposed surface, e.g. from 1 to 200 times greater in area, and result from the use of protrusion elements having converging sides.

The channels are formed in the flexible graphite sheet at a plurality of locations by mechanical impact. Thus, a pattern of channels is formed in the flexible graphite sheet. That pattern can be devised in order to control, optimize or maximize fluid flow through the channels, as desired. For instance, the pattern formed in the flexible graphite sheet can comprise selective placement of the channels, as described, or it can comprise variations in channel density or channel shape in order to equalize fluid pressure along the surface of the electrode when in use, as well as for other purposes which would be apparent to the skilled artisan.

In accordance with the present invention, the flexible graphite sheet can be designed, or engineered, such that flooding of the fuel cell, especially on the cathodic side, can be reduced or avoided. More specifically, the location along the flexible graphite sheet where flooding is most likely to occur, when the sheet is employed as a fuel cell electrode, can be identified, and the channels at or near that location can be formed having a larger cross-sectional diameter than other channels, in order to encourage water flow through those larger diameter channels. For instance, if it is determined that flooding is more likely to occur at or near the outlet of the fuel cell, then the channels at or near the outlet region can be formed so as to be larger in cross-section than the remaining channels.

Alternatively, or in addition, the shape of the channels can be engineered to help prevent flooding. As noted above, the channels can be formed such that the openings at one of the surfaces of the flexible graphite sheet are larger than the openings at the other surface. Although it may be desirable throughout the majority of the flexible graphite sheet electrode to form the channels such that the larger openings are arrayed towards the flow field plate of the fuel cell, to facilitate gas flow to the membrane, the channels can be formed so that the larger openings are arrayed towards the membrane at those locations prone to flooding (such as at or near the outlet) to facilitate water flow away from the membrane (or vice versa). Moreover, the pattern density of the channels can be designed such that the channels are more densely situated, or less densely situated but larger in cross-section, at or near the potential flooding locations, again to encourage water flow away from those areas.

Furthermore, the density of the graphite sheet itself can be advantageously employed to reduce or eliminate flooding. More specifically, forming the sheet such that its density (especially at or near those locations where flooding is most likely) is greater than about 1.3 g/cc, and more preferably greater than about 1.5 g/cc, results in an electrode less apt to flooding in an electrochemical fuel cell. Most preferred densities in this regard are between about 1.5g/cc and about 1.75 g/cc.

In an especially preferred embodiment, the channels through the flexible graphite sheet of the present invention can be engineered such that differently oriented or shaped channels are arrayed in a pattern at or near the potential flooding locations. Thus, to facilitate both gas flow away from the flow field plate and towards the membrane, and water flow away from the membrane, the channels at or near the potential flooding location(s) of the fuel cell can comprise both channels whose larger openings face the membrane and channels whose larger openings face the flow field plate. These differently oriented channels can be simply alternated, or they can be arrayed in a pattern designed to optimize both gas flow and flooding-reduction. In this way, gas flow to the membrane can be maximized to the extent possible, even in those locations where there is a flooding danger.

The impact force used to form the channels is preferably delivered using a patterned roller, suitably controlled to provide well-formed channels in the graphite sheet. In the course of impacting the flexible graphite sheet to form channels, graphite is displaced within the sheet to disrupt and deform the parallel orientation of the expanded graphite particles. In effect the displaced graphite is being "die-molded" by the sides of adjacent protrusions and the smooth surface of the roller. This reduces the anisotropy in the flexible graphite sheet and thus increases the electrical and thermal conductivity of the sheet in the direction transverse to the opposed surfaces. A similar effect is achieved with frusto-conical, parallel-sided peg-shaped and other-shaped protrusions.

As noted above, an electrochemical fuel cell includes a membrane electrode assembly that comprises an ion exchange membrane sandwiched between two electrodes, at least one of which is the above-described graphite sheet. A typical substrate for the ion (or proton) exchange membrane is a porous material, such as a glass cloth or a polymeric material such as a porous polyolefin like polyethylene or polypropylene. Preferably, for use in a commercially practical electrochemical fuel cell, the substrate for the PEM should be between about 10 and 200 microns thick, with an average pore diameter of about 0.1 to about 1.0 microns and porosity of about 50 to 98%. Perfluorinated polymers, like polytetrafluoroethylene, are sometimes preferred. The substrate can then be impregnated to control properties such as porosity. Styrene impregnants such as trifluorostyrene and substituted trifluorostyrenes have been suggested as particularly suitable for use in fuel cell proton exchange membranes. One preferred impregnant useful in the practice of the invention is available from Ion Power Inc. under the tradename Liquione-1100; an especially preferred impregnant is a perfluorinated polymer membrane sold under the tradename Nafion® by DuPont Company.

Suitable materials for use as the proton exchange membrane are described in U.S. Pat. Nos. 5,773,480 and 5,834,523, the disclosures of each of which are incorporated herein by reference.

In order to facilitate and/or enable the dissociation/association reactions required for fuel cell operation, a catalyst metal is loaded on the two opposed major surfaces of the PEM. Most commonly, the catalyst is a noble metal like platinum or a platinum group metal, often loaded on graphite or carbon particles. The catalyst can be loaded directly to the surface of the PEM, or a catalyst-loaded moiety, such as activated carbon paper, can be bonded to either surface of the PEM, as would be familiar to the skilled artisan. In operation, the fluid (i.e., either hydrogen gas or oxygen gas, depending on the "side" of the membrane electrode assembly in question) contacts the catalyst. In the case of hydrogen, on the anodic side of the assembly, the catalyst catalyzes the dissociation of the hydrogen to its constituent protons and electrons; the protons then migrate through the proton exchange membrane, and the electrons are utilized as electrical energy. In the case of oxygen, on the cathodic side of the assembly, the catalyst catalyzes the association of the protons and electrons, with the oxygen, to form water.

Advantageously, the catalyst is selectively loaded on or at the proton exchange membrane in a pattern determined by the channel pattern of the electrode that faces the particular PEM side. Most preferably, the catalyst is arrayed on the PEM at locations corresponding to the walls forming channels of the graphite sheet electrode as described above, in order to maximize catalyst effectiveness. In this way, less catalyst is needed for similar electrical outputs from the fuel cell, resulting in significant savings and other advantages, such as reduced waste disposal needs.

More particularly, in operation, the reaction catalyzed by the catalyst metal, that is, the dissociation of hydrogen molecules and atoms into constituent protons and electrons, and the re-association of the protons and electrons, in combination with oxygen, into water, occurs at the point where the surfaces of the electrode meet (or abut) the ion exchange membrane. It is at this location and, effectively, only at this location, where dissociated electrons can be conducted along the electrode and dissociated protons can migrate across the membrane (and vice versa with respect to the cathodic side of the fuel cell). Thus, it is only at or near where the walls of the channels formed in the inventive graphite sheet abut the ion exchange membrane, where catalyst should be selectively loaded.

It may also be possible to reduce further the potential flooding of the flexible graphite sheet of the present invention when used as an electrode in an electrochemical fuel cell by rendering the sheet more hydrophobic (as opposed to untreated flexible graphite sheet) in order to help prevent the potential flooding resulting from water formation at or near the cathode. To do so, a water resistant additive can be used to coat or impregnate the sheet, providing added hydrophobicity while not substantially degrading the properties of the sheet useful in forming an electrochemical fuel cell cathode. Preferred water resistant additives include fluoropolymers, such as dispersions of polytetrafluoroethylene (i.e., Teflon™) material.

DETAILED DESCRIPTION OF THE PREFERRED EMBODIMENTS

With reference to FIGS. 1–5(A), a compressed mass of expanded graphite particles, in the form of a flexible graphite sheet, is shown at 110, 112, 114, 116, 118, respectively. Flexible graphite sheets 110, 112, 114, 116, 118 are provided with channels 20, which are preferably smooth-sided as indicated at 67 in FIG. 8, and which pass between the opposed surfaces 30, 40 of flexible graphite sheets 110, 112, 114, 116, 118, and are separated by walls 3 of compressed expandable graphite. The channels 20 preferably have openings 50 on one of the opposed surfaces 30 which are larger than the openings 60 in the other opposed surface 40. The channels can have different configurations as shown at 20'–20''' in FIGS. 7(B), 7(C), 7(D) which are formed using flat-ended protrusion elements of different shapes as shown at 75, 175, 275, 375 in FIGS. 7(A), 7(B), 7(C), 7(D), suitably formed of metal, e.g. steel, and integral with and extending from the pressing roller 70 of the impacting device shown in FIG. 6. The smooth flat-ends of the protrusion elements, shown at 77, 177, 277, 377, and the smooth bearing surface 73, of roller 70, and the smooth bearing surface 78 of roller 72 (or alternatively flat metal plate 79), ensure deformation and complete displacement of graphite within the flexible graphite sheet, i.e. there are no rough or ragged edges or debris resulting from the channel-forming impact. Preferred protrusion elements have decreasing cross-section in the direction away from the pressing roller 70 to provide larger channel openings on the side of the sheet that is initially impacted. The development of smooth, unobstructed surfaces 63 surrounding channel openings 60, enables the free flow of fluid into and through smooth-sided (at 67) channels 20.

Figure 6:
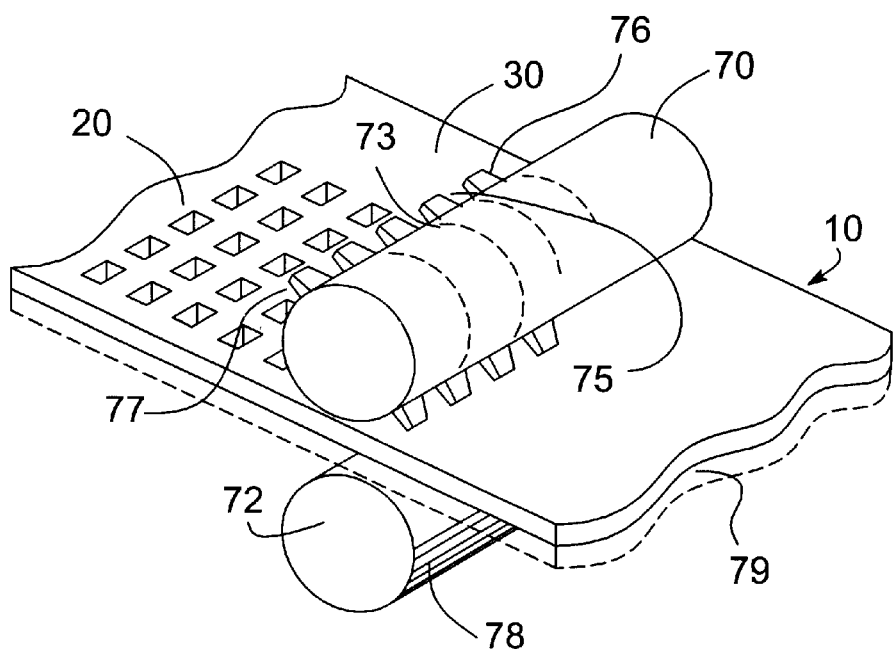
FIGS. 6, 6(A) show embodiments of mechanisms for making the articles of FIGS. 1–5(A)
Figure 7A:
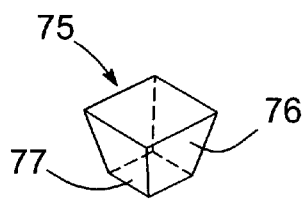
FIGS. 7(A), (B), (C), (D) show various flat-ended protrusion elements used in making the channels in the channeled sheet of FIGS. 1–5(A)
Figure 7B:
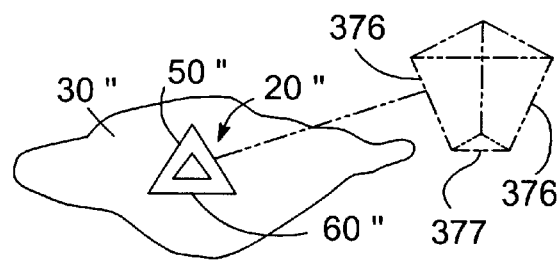
Figure 7C:
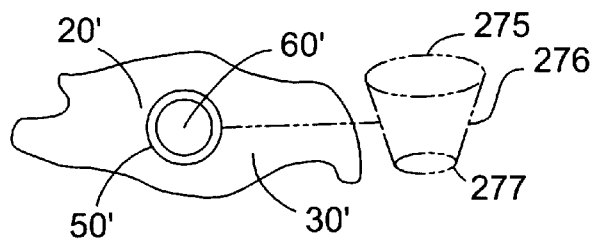
Figure 7D:
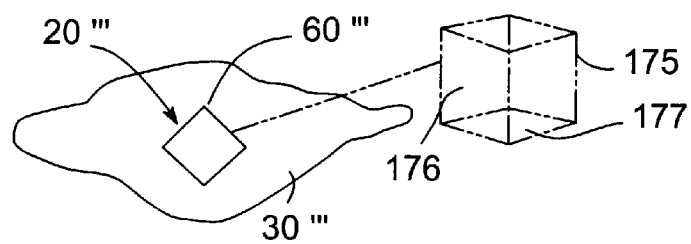

In a preferred embodiment, openings on one of the opposed surfaces are larger than the channel openings in the other opposed surface, e.g. from 1 to 200 times greater in area, and result from the use of protrusion elements having converging sides such as shown at 76, 276, 376. The channels 20 are formed in the flexible graphite sheet 110, 112, 114, 116, 118, at a plurality of pre-determined locations by mechanical impact at the predetermined locations using a mechanism such as shown in FIG. 6 comprising a pair of steel rollers 70, 72 with at least one of the rollers having truncated, i.e. flat-ended, prism-shaped protrusions 75 which impact surface 30 of flexible graphite sheet 110, 112, 114, 116, 118, to displace graphite and penetrate sheet 10 to form open channels 20. In practice, both rollers 70, 72 can be provided with "out-of-register" protrusions, or a flat metal plate indicated at 79, can be used in place of smooth-surfaced roller 72.

Figure 8:
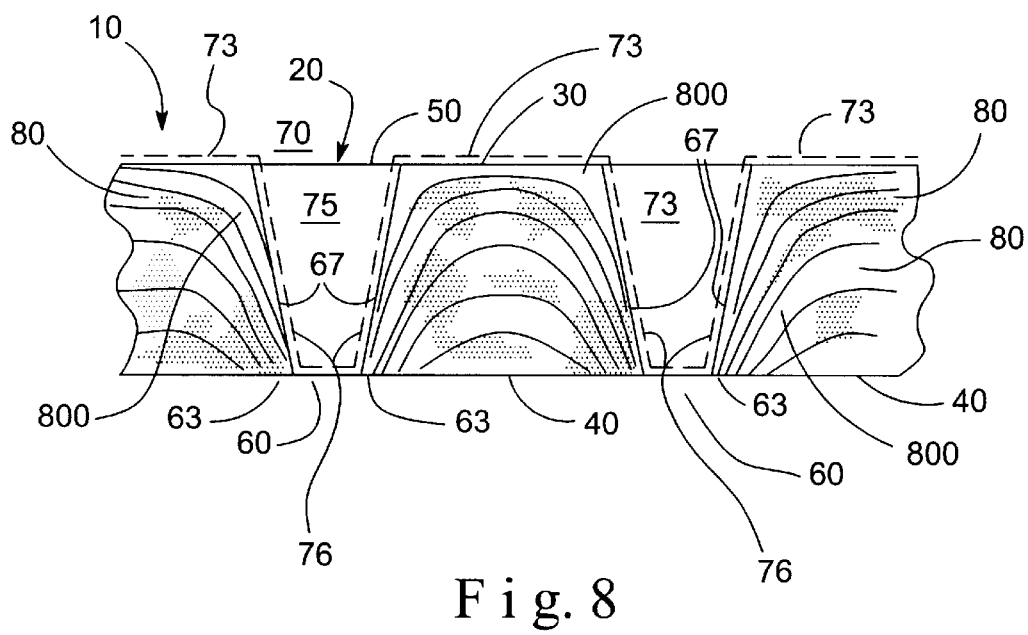
FIG. 8 is a sketch of an enlarged elevation view of an article formed of flexible graphite sheet in accordance with the present invention.

Conventional flexible graphite sheet exhibits anisotropic properties, i.e. the electrical conductivity and thermal conductivity of the sheet is substantially lower in the direction transverse to its opposed surfaces ("c" direction) than in the direction ("a" direction) parallel to its opposed surfaces. In the course of impacting flexible graphite sheet 110, 112, 114, 116, 118, to form channels 20, as illustrated in FIG. 6, graphite is displaced within flexible graphite sheet 110, 112, 114, 116, 118, by flat-ended (at 77) protrusions 75 to push aside graphite as it travels to and bears against smooth surface 73 of roller 70 to disrupt and deform the parallel orientation of expanded graphite particles 80 as shown at 800 in FIG. 8. This region of 800, adjacent channels 20, shows disruption of the parallel orientation into an oblique, non-parallel orientation is optically observable at magnifications of 100× and higher. In effect the displaced graphite is being "die-molded" by the sides 76 of adjacent protrusions 75 and the smooth surface 73 of roller 70 as illustrated in FIG. 8. This reduces the anisotropy in flexible graphite sheet 110, 112, 114, 116, 118, and thus increases the electrical and thermal conductivity of sheet 110, 112, 114, 116, 118 in the direction transverse to the opposed surfaces 30, 40. A similar effect is achieved with frusto-conical and parallel-sided peg-shaped flat-ended protrusions 275 and 175.

Figure 1A:
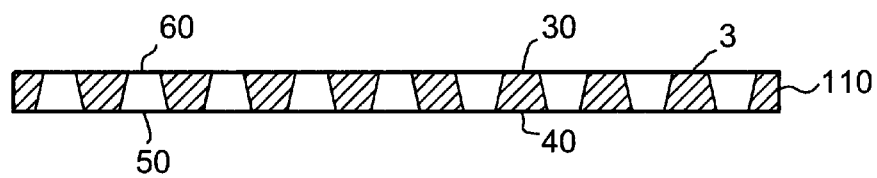
FIG. 1(A) is a cross-sectional view of the sheet of FIG. 1, taken along lines 1(A)—1(A)
Figure 2:
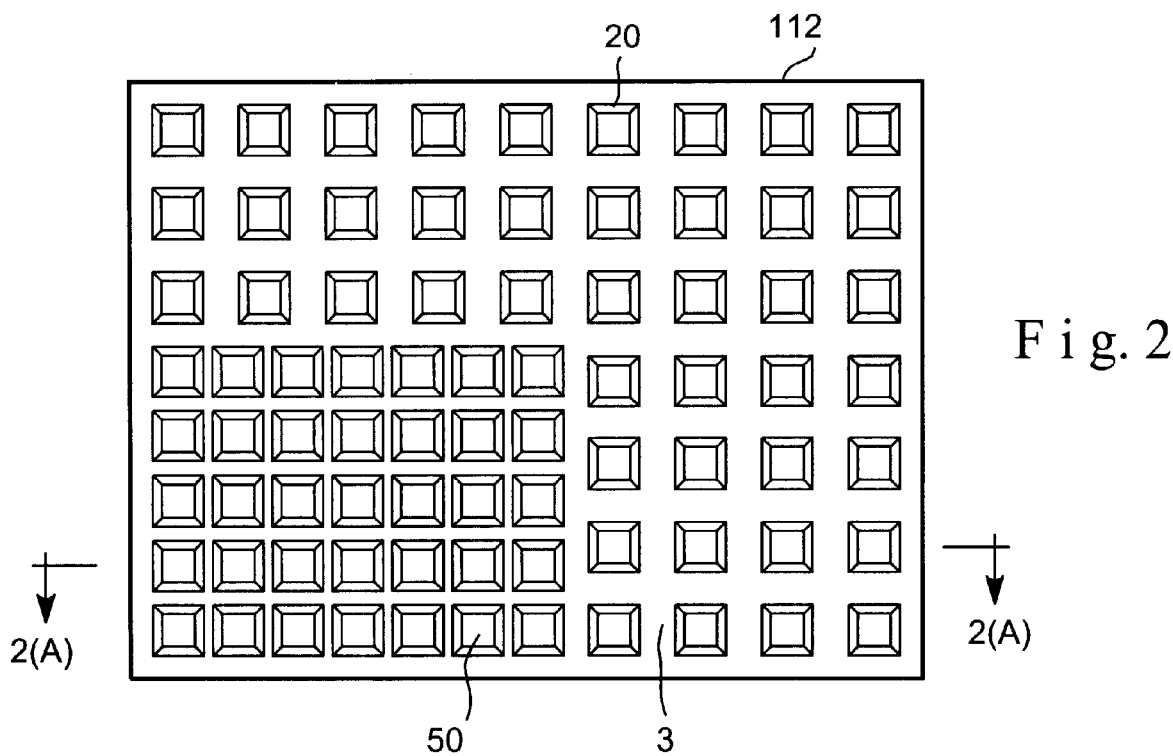
FIG. 2 is a plan view of an alternate embodiment of a transversely permeable sheet of flexible graphite having transverse channels engineered in accordance with the present invention.
Figure 2A:
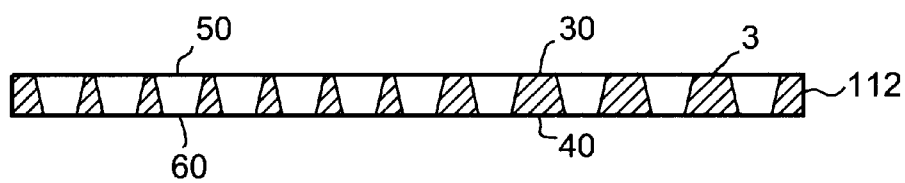
FIG. 2(A) is a cross-sectional view of the sheet of FIG. 2, taken along lines 2(A)—2(A)
Figure 4:
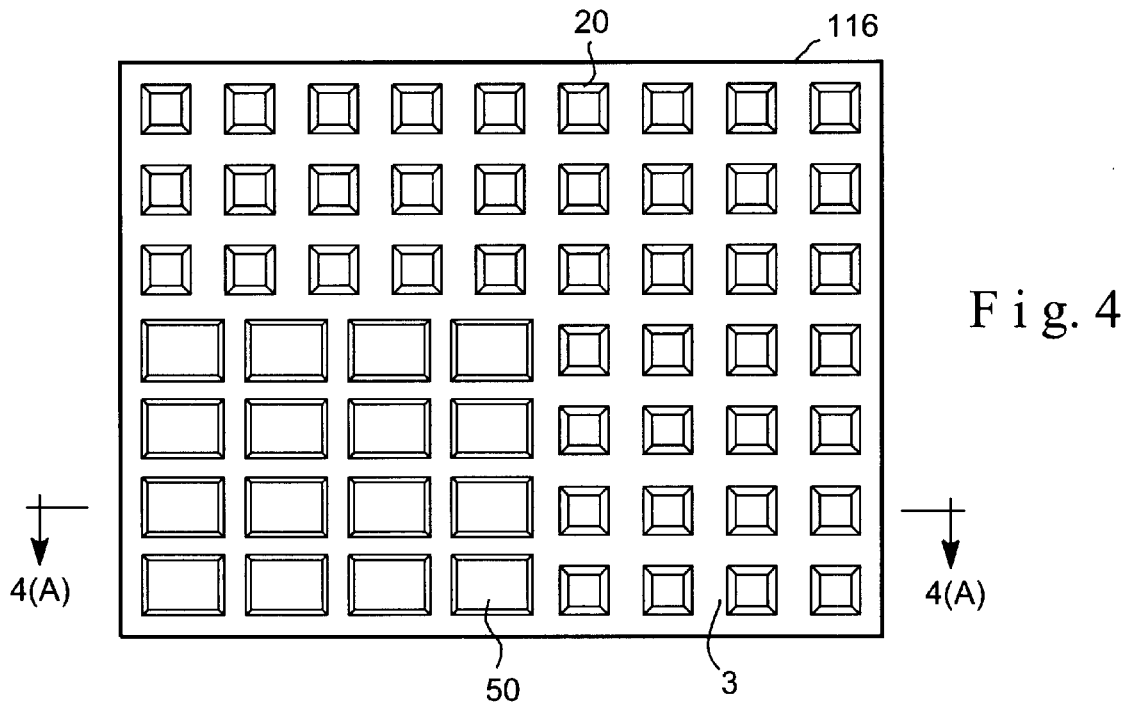
FIG. 4 is a plan view of an alternate embodiment of a transversely permeable sheet of flexible graphite having transverse channels engineered in accordance with the present invention.
Figure 4A:
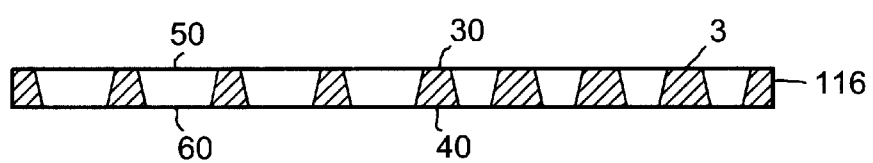
FIG. 4(A) is a cross-sectional view of the sheet of FIG. 4, taken along lines 4(A)—4(A)
Figure 5:
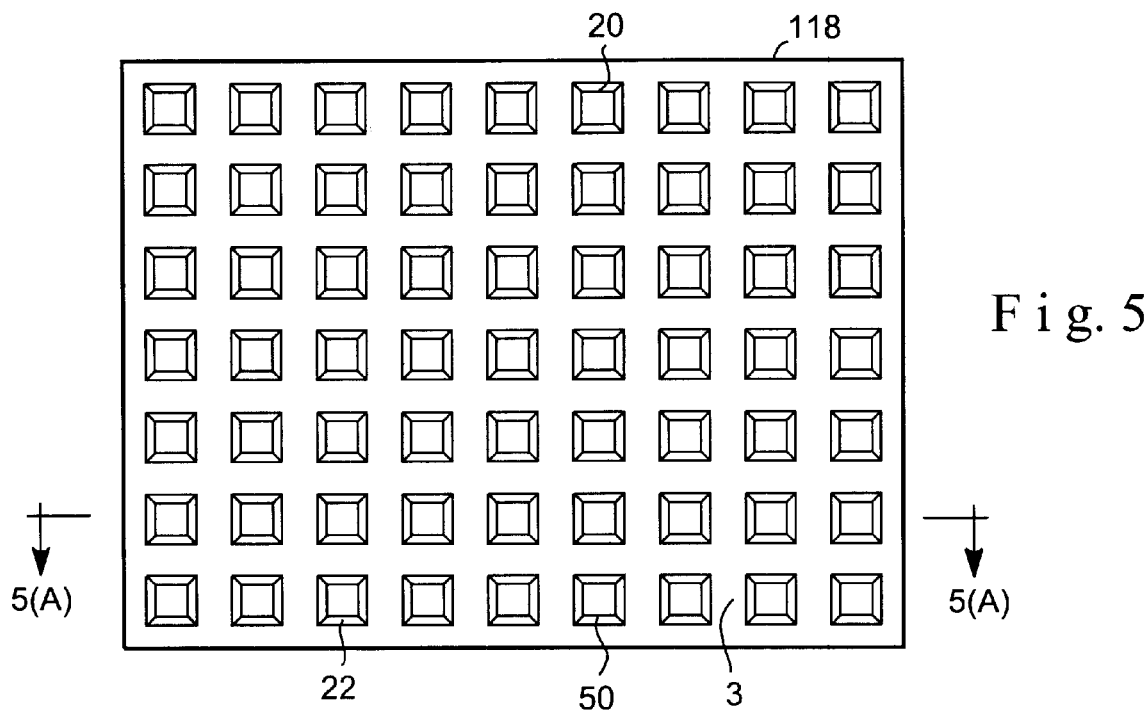
FIG. 5 is a plan view of an alternate embodiment of a transversely permeable sheet of flexible graphite having transverse channels engineered in accordance with the present invention.
Figure 5A:
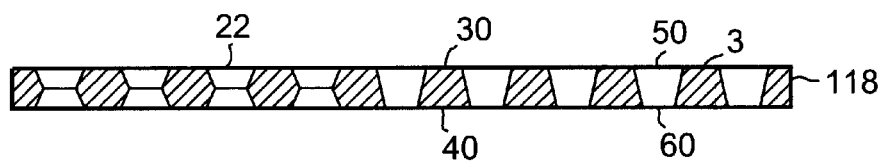
FIG. 5(A) is a cross-sectional view of the sheet of FIG. 5, taken along lines 5(A)—5(A)

In order to reduce the potential for flooding when flexible graphite sheet 10 is employed as an electrode in an electrochemical fuel cell, channels 20 are engineered by, for instance, engineering one or more of protrusions 75, 175, 275 and 375, such as by using larger or smaller size protrusions. Likewise, rollers 70, 72 can be engineered so as to array protrusions 75, 175, 275 and/or 375 in a specific pattern or arrangement, as discussed hereinabove. For instance, rollers 70, 72 can be engineered such that protrusions 75, 175, 275 and/or 375 of differing sizes are arrayed so that the channels at or near a potential flooding location have a larger cross-sectional diameter than other channels (as seen in FIGS. 4, 4(A)). Alternatively, or in addition, rollers 70, 72 can be fabricated such that protrusions 75, 175, 275 and/or 375 form channels 20 so that the larger openings are arrayed towards the membrane at those locations needed to facilitate water flow away from the membrane (as seen in FIGS. 1, 1(A)). Moreover, rollers 70, 72 can be fabricated such that channels 20 are more densely situated at or near the potential flooding locations, again to encourage water flow away from those areas (as seen in FIGS. 2, 2(A)).

Figures 3, 3A:
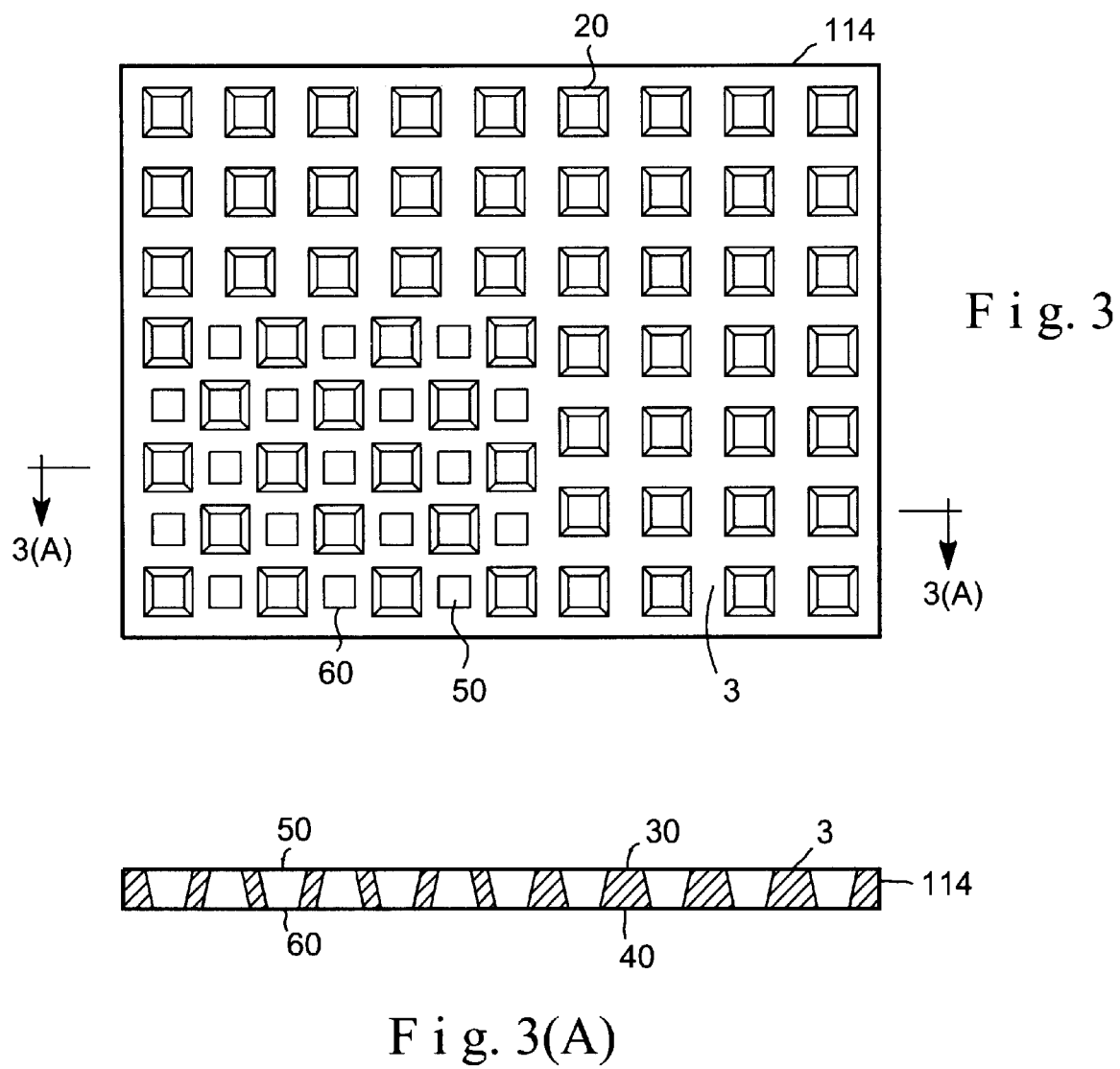
FIG. 3 is a plan view of an alternate embodiment of a transversely permeable sheet of flexible graphite having transverse channels engineered in accordance with the present invention.
FIG. 3(A) is a cross-sectional view of the sheet of FIG. 3, taken along lines 3(A)—3(A)
Figure 6A:
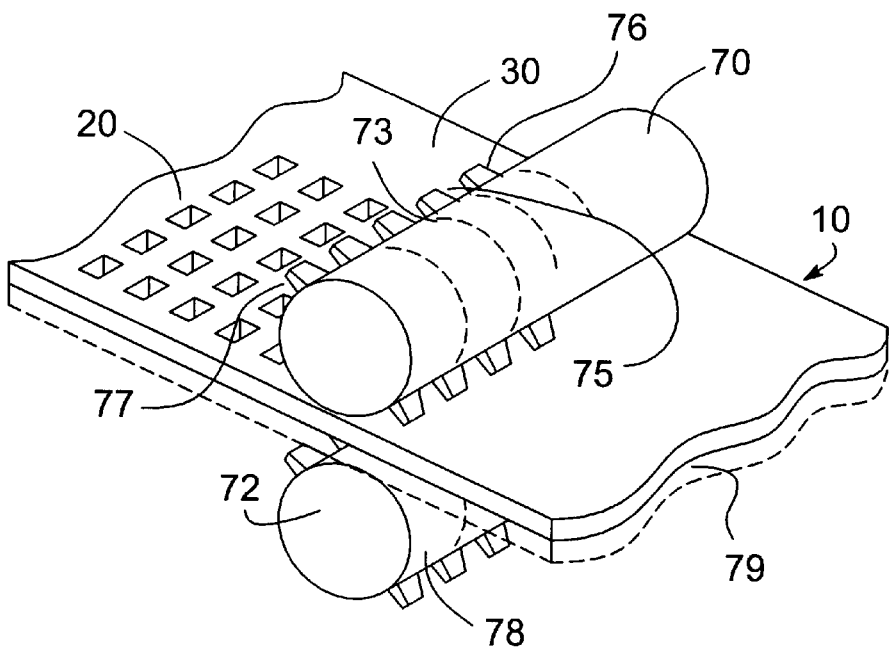

In an especially preferred embodiment, rollers 70, 72 are designed such that differently oriented or shaped channels 20 are arrayed in a pattern at or near the potential flooding locations. This can be accomplished by arraying protrusions 75, 175, 275 and/or 375 on each of rollers 70, 72 as illustrated in FIG. 6(A). Indeed, in this manner, sheet 110 of FIGS. 1, 1(A) can be formed, since it would be necessary to have shaped protrusions 75, 175, 275 and/or 375 impacting sheet 110 from either opposed surface 30, 40 to form channels 20 having larger opening 50 on both opposed surfaces 30, 40 on the same sheet while using only one set of rollers 70, 72. Likewise, as shown in FIGS. 3, 3(A), protrusions 75, 175, 275 and/or 375 on rollers 70, 72 can be formed so as to be complementary in shape, and aligned so as to create channels 22 having "hybrid" or a combination of the shapes which can be formed using protrusions 75, 175, 275 and/or 375 which are not complementary (as seen in FIGS. 1(A), 2(A), 4(A), 5(A)).

As noted, it is also possible to treat flexible graphite sheet 110, 112, 114, 116, 118 (and, more particularly, flexible graphite sheet 110, 112, 114, 116, 118 intended to be used as the cathode in electrochemical fuel cell 500) with a water resistant additive to further deter flooding. Moreover, flexible graphite sheet 110, 112, 114, 116, 118 can be treated with the water resistant additive either before or after resin curing, although prior to resin curing is more desirable. For instance, a resin-impregnated flexible graphite sheet 110, 112, 114, 116, 118 treated in accordance with the present invention, can be cured to at least about 250° C., more advantageously at least about 350° C. for at least about 30 minutes. If sheet 110, 112, 114, 116, 118 is not resin-impregnated, curing is typically at a temperature of at least about 350° C. for at least about 30 minutes.

Flexible graphite sheet 110, 112, 114, 116, 118 can be provided with increased hydrophobicity by treating with the water resistant additive via a variety of treatment regimen. For instance, sheet 110 can be impregnated by the water resistant additive by spraying sheet 110 with or dipping sheet 110 in a dispersion (such as an aqueous dispersion) of the water resistant additive. Particular water resistant additives include fluoropolymers like perfluoroalkoxy copolymers like a polytetrafluoroethylene/propyl vinyl ether copolymer (PTFE-PPVE) commercially available as PFA TE946 from E. I. du Pont de Nemours and Company of Wilmington, Delaware or other commercially available fluoropolymer compositions like Zonyl 8300, also available from du Pont. The water resistant additive can be included in the dispersion at any levels suitable to achieve the desired hydrophobicity to flexible graphite sheet 110, 112, 114, 116, 118. Typically, the dispersion will comprise about 2% to about 60% or higher of the water resistant additive. More typically, the dispersion comprises about 5% to about 35% water resistant additive.

The primary criteria for the amount of water resistant additive to be applied to flexible graphite sheet 110, 112, 114, 116, 118 is the added hydrophobicity of the sheet while maintaining the desirable criteria for use of sheet 110, 112, 114, 116, 118 as a cathode in electrochemical fuel cell 500. Generally, flexible graphite sheet 110, 112, 114, 116, 118 should exhibit a weight gain in the range of about 2% to about 34% in order to achieve the desired characteristics.

Figure 9:
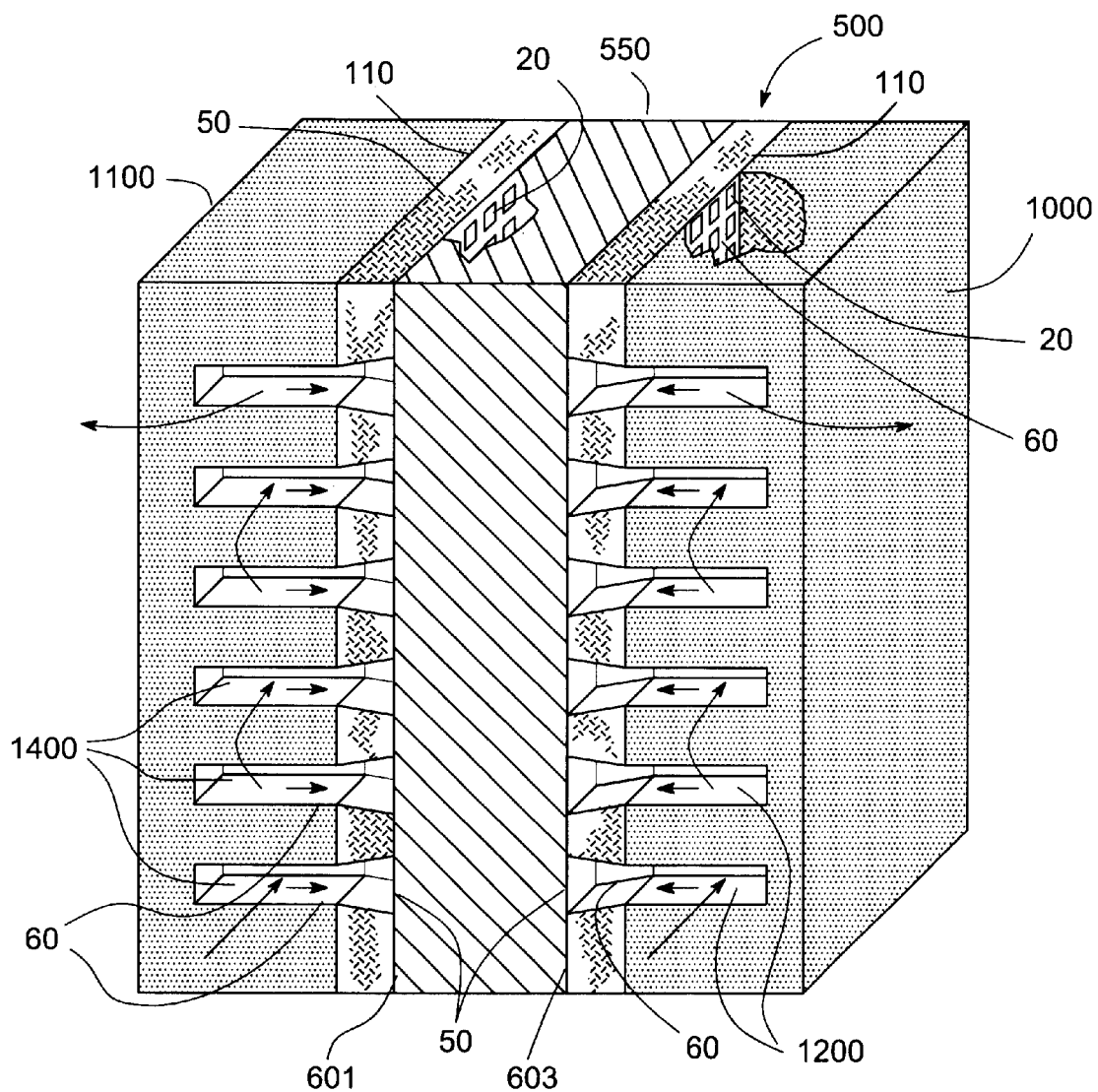
FIGS. 9, 10 and 10(A) show a fluid permeable electrode assembly that includes a transversely permeable article in accordance with the present invention.
Figure 10:
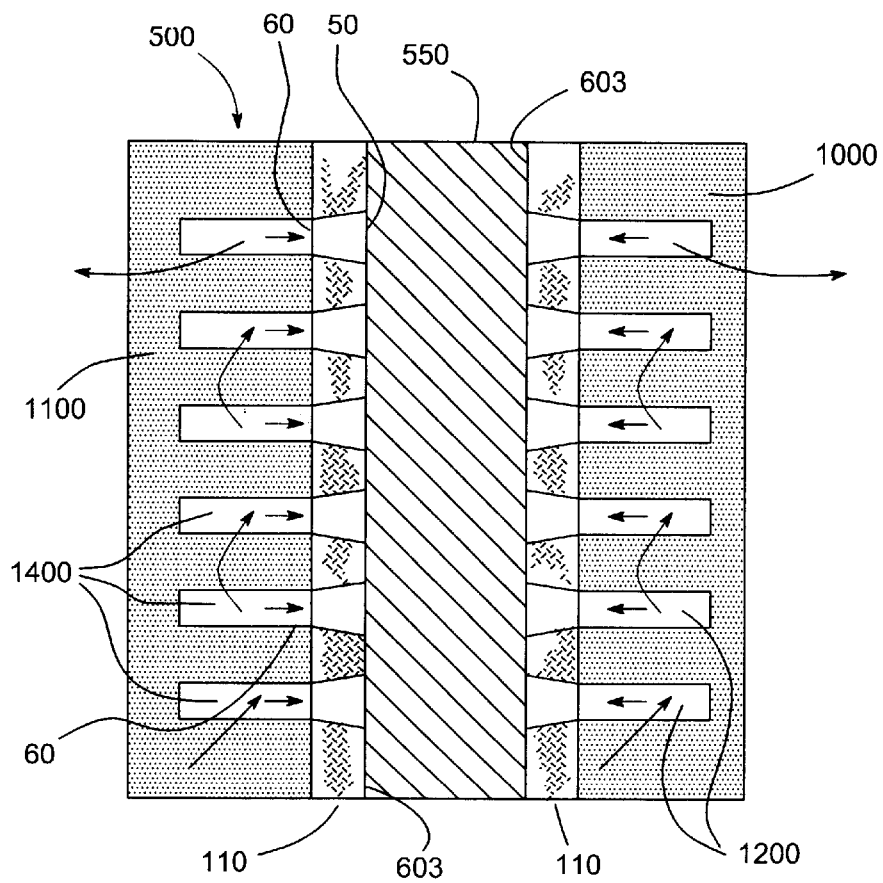
Figure 10A:
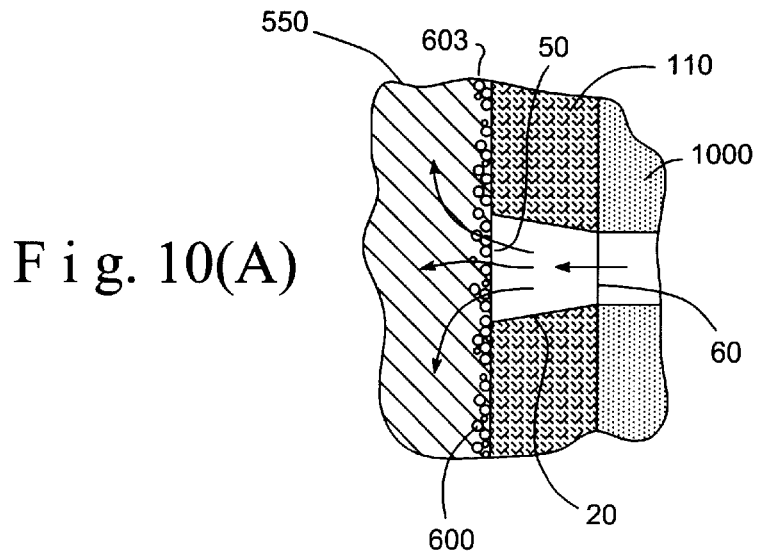

The channeled gas permeable flexible graphite sheet 110, 112, 114, 116, 118 of FIGS. 1–5(A) is used as one or both electrodes in an electrochemical fuel cell 500 shown schematically in FIGS. 9, 10 and 10(A).

FIG. 9, FIG. 10 and FIG. 10(A) show, schematically, the basic elements of an electrochemical fuel cell, more complete details of which are disclosed in U.S. Pat. Nos. 4,988,583 and 5,300,370 and PCT WO 95/16287 (Jun. 15, 1995) and each of which is incorporated herein by reference.

With reference to FIG. 9, FIG. 10 and FIG. 10(A), the fuel cell indicated generally at 500, comprises electrolyte in the form of a plastic e.g. a solid polymer ion exchange membrane 550; channeled flexible graphite sheet electrodes 110, 112, 114, 116 and/or 118 in accordance with the present invention; and flow field plates 1000, 1100 which respectively abut electrodes 110, 112, 114, 116 and/or 118. Pressurized fuel is circulated through grooves 1400 of fuel flow field plate 1100 and pressurized oxidant is circulated through grooves 1200. The above described electrochemical fuel cell is combined with others in a fuel cell stack to provide the desired level of electric power as described in the above-noted U.S. Pat. No. 5,300,370.

With the development of electrodes 110, 112, 114, 116, 118, it becomes possible to selectively load catalyst 600 on the surfaces of the solid polymer exchange membrane 550. In this way, the catalyst metal is only present in a selected pattern on membrane 550 rather than relatively uniformly distributed thereon and, therefore, the amount of catalyst employed is minimized while maximizing the effectiveness of the catalyst. This is because catalyst is now only disposed on the surfaces of the membrane where the walls 3 of channels 20, 22 abut membrane 550.

The operation of fuel cell 500 requires that the electrodes 110, 112, 114, 116 and/or 118 be porous to the fuel and oxidant fluids, e.g. hydrogen and oxygen, to permit these components to readily pass from the grooves 1400, 1200 through electrodes 110, 112, 114, 116 and/or 118 to contact the catalyst 600 on the surfaces of the membrane 550, as shown in FIG. 10(A), and enable protons derived from hydrogen to migrate through ion exchange membrane 550. In the electrode 110, 112, 114, 116 and/or 118 of the present invention, channels 20 are positioned to adjacently cover grooves 1400, 1200 of the flow field plates so that the pressurized gas from the grooves passes through the smaller openings 60 of channels 20 and exits the larger openings 50 of channels 20 perhaps other than in an engineered portion of electrode 110, 112, 114, 116 and/or 118, in accordance with the present invention). The initial velocity of the gas at the smaller openings 60 is higher than the gas flow at the larger openings 50 with the result that the gas is slowed down when it contacts the catalyst 600 on the surface of membrane 550 and the residence time of gas-catalyst contact is increased and the area of gas exposure at the membrane 550 is maximized. Alternatively, the opposite arrangement can also be contemplated. This feature, together with the increased electrical conductivity of the flexible graphite electrode of the present invention enables more efficient fuel cell operation.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. An electrode for an electrochemical fuel cell, comprising a sheet of a compressed mass of expanded graphite particles having a plurality of transverse fluid channels passing through the sheet between first and second parallel, opposed surfaces of the sheet in a selected pattern, wherein the sheet is engineered so as to reduce flooding in the electrochemical fuel cell, and wherein the shape of the channels is such that channels which correspond to locations at or near where flooding can occur in the electrochemical fuel cell facilitate water flow away from the fuel cell membrane.

2. The electrode of claim 1 wherein the channels are designed such that the channels which correspond to locations at or near where flooding can occur in the electrochemical fuel cell have a diameter greater than other channels in the electrode.

3. The electrode of claim 1 wherein the pattern of channels can be formed by selective placement of the channels, variations in channel density, variations of channel shape, or combinations thereof so as to reduce flooding in the electrochemical fuel cell.

4. The electrode of claim 3 wherein the compressed mass of expanded graphite particles is characterized by expanded graphite particles adjacent the channels extending obliquely with respect to the opposed surfaces.

5. The electrode of claim 4 wherein channel openings at the first surface are larger than the channel openings at the second surface.

6. The electrode of claim 1 wherein the density of the sheet is engineered so as to reduce flooding in the electrochemical fuel cell.

7. The electrode of claim 6 wherein the graphite sheet has a density of at least about 1.5 g/cc.

8. The electrode of claim 1 wherein the graphite sheet has a thickness of about 0.075 mm to 0.375 mm adjacent said channels and a density of about 0.5 to 1.5 grams per cubic centimeter.

9. An electrode for an electrochemical fuel cell, comprising a sheet of a compressed mass of expanded graphite particles having a plurality of transverse fluid channels passing through the sheet between first and second parallel, opposed surfaces of the sheet in a selected pattern, wherein the sheet is engineered so as to reduce flooding in the electrochemical fuel cell, and wherein the channels are designed such that the channels which correspond to locations at or near where flooding can occur in the electrochemical fuel cell have a diameter greater than other channels in the electrode.

10. An electrode for an electrochemical fuel cell, comprising a sheet of a compressed mass of expanded graphite particles having a plurality of transverse fluid channels passing through the sheet between first and second parallel, opposed surfaces of the sheet in a selected pattern, wherein the sheet is engineered so as to reduce flooding in the electrochemical fuel cell, and wherein the pattern of channels can be formed by selective placement of the channels, variations in channel density, variations of channel shape, or combinations thereof so as to reduce flooding in the electrochemical fuel cell.

11. A membrane electrode assembly for an electrochemical fuel cell comprising a pair of electrodes and an ion exchange membrane having opposed major surfaces positioned between the electrodes, at least one of the electrodes being formed of a sheet of a compressed mass of expanded graphite particles having a plurality of transverse fluid channels passing through the sheet between first and second parallel, opposed surfaces of the sheet in a selected pattern, the channels being separated by walls of compressed expandable graphite, the walls formed on one of the opposed surfaces abutting the ion exchange membrane, wherein the channels are designed so as to reduce flooding in the electrochemical fuel cell, and wherein the channels are designed such that the channels that correspond to locations at or near where flooding can occur in the electrochemical fuel cell have a diameter greater than other channels in the electrode.

12. The assembly of claim 11 wherein the shape of the channels is such that channels that correspond to locations at or near where flooding can occur in the electrochemical fuel cell facilitate water flow away from the fuel cell membrane.

13. The assembly of claim 10 wherein the density of the sheet is engineered so as to reduce flooding in the electrochemical fuel cell.

14. The assembly of claim 10 wherein the pattern of channels can be formed by selective placement of the channels, variations in channel density, variations of channel shape, or combinations thereof so as to reduce flooding in the electrochemical fuel cell.

15. The assembly of claim 11 wherein the channel openings at the first surface are larger than the channel openings at the second surface.

16. The assembly of claim 11 wherein the density of the sheet is engineered so as to reduce flooding in the electrochemical fuel cell.

17. The assembly of claim 16 wherein the sheet has a density of at least about 1.5 g/cc.

18. The assembly of claim 11 wherein the graphite sheet has a thickness of about 0.075 mm to 0.375 mm adjacent said channels and a density of about 0.5 to 1.5 grams per cubic centimeter.

19. The assembly of claim 10 further comprising a catalyst loaded on both major surfaces of the ion exchange membrane.

20. The assembly of claim 19 wherein the catalyst is loaded on a surface of the ion exchange membrane in a pattern corresponding to the pattern of the walls of the channels of the sheet of a compressed mass of expanded graphite particles abutting that surface of the ion exchange membrane.

21. A membrane electrode assembly for an electrochemical fuel cell comprising a pair of electrodes and an ion exchange membrane having opposed major surfaces positioned between the electrodes, at least one of the electrodes being formed of a sheet of a compressed mass of expanded graphite particles having a plurality of transverse fluid channels passing through the sheet between first and second parallel, opposed surfaces of the sheet in a selected pattern, the channels being separated by walls of compressed expandable graphite, the walls formed on one of the opposed surfaces abutting the ion exchange membrane, wherein the channels are designed so as to reduce flooding in the electrochemical fuel cell, and wherein the shape of the channels is such that channels that correspond to locations at or near where flooding can occur in the electrochemical fuel cell facilitate water flow away from the fuel cell membrane.

22. A membrane electrode assembly for an electrochemical fuel cell comprising a pair of electrodes and an ion exchange membrane having opposed major surfaces positioned between the electrodes, at least one of the electrodes being formed of a sheet of a compressed mass of expanded graphite particles having a plurality of transverse fluid channels passing through the sheet between first and second parallel, opposed surfaces of the sheet in a selected pattern, the channels being separated by walls of compressed expandable graphite, the walls formed on one of the opposed surfaces abutting the ion exchange membrane, wherein the channels are designed so as to reduce flooding in the electrochemical fuel cell, and wherein the pattern of channels can be formed by selective placement of the channels, variations in channel density, variations of channel shape, or combinations thereof so as to reduce flooding in the electrochemical fuel cell.

23. A membrane electrode assembly for an electrochemical fuel cell comprising a pair of electrodes and an ion exchange membrane having opposed major surfaces positioned between the electrodes, at least one of the electrodes being formed of a sheet of a compressed mass of expanded graphite particles having a plurality of transverse fluid channels passing through the sheet between first and second parallel, opposed surfaces of the sheet in a selected pattern, the channels being separated by walls of compressed expandable graphite, the walls formed on one of the opposed surfaces abutting the ion exchange membrane, wherein the channels are designed so as to reduce flooding in the electrochemical fuel cell, and wherein the channel openings at the first surface are larger than the channel openings at the second surface.

* * * * *